United States Patent [19]

Presentey

[11] 3,789,238

[45] Jan. 29, 1974

[54] OPEN SWITCH BYPASS CIRCUIT

[76] Inventor: Shelley M. Presentey, 1268 Henry Farm Dr., Ottawa, Canada

[22] Filed: Apr. 11, 1973

[21] Appl. No.: 350,177

[52] U.S. Cl. ...................... 307/119, 318/6, 242/189
[51] Int. Cl. .......................................... H01h 35/00
[58] Field of Search ............. 307/119; 179/100.2 Z; 200/61.13, 61.18; 242/186, 189, 190; 318/6; 340/259

[56] References Cited

UNITED STATES PATENTS 3,572,606 3/1971 Yamamoto .......................... 242/57

*Primary Examiner*—Robert K. Schaefer
*Assistant Examiner*—M. Ginsburg
*Attorney, Agent, or Firm*—Michael S. Striker

[57] ABSTRACT

A web transport arrangement, particularly a magnetic tape transport arrangement, includes a supply reel, an elongated web or magnetic tape wound on the supply reel and having one end secured to the supply reel. A reversible advancing unit includes an electric motor and is operative for advancing the web of magnetic tape in a first direction to unwind the web from the supply reel and is alternatively operative to advance the web in opposite second direction to rewind the web or tape onto the supply reel. The motor has a first motor current path and also has an auxiliary motor current path. The first motor current path includes a first switch and the auxiliary motor current path includes an axuiliary switch. A mode selector has at least first and second settings for respectively causing the advancing unit to advance the web in said first and second directions. A web-end-sensing unit is operative for opening the first switch to stop said advancing unit in response to an increase in web tension resulting upon substantially complete unwinding of the web from the supply reel. An overriding arrangement is operative, when said selector is in a setting other than said first setting, for closing the auxiliary switch, to permit the flow of motor current through the auxiliary motor current path.

12 Claims, 3 Drawing Figures

OPEN SWITCH BYPASS CIRCUIT

BACKGROUND OF THE INVENTION

The present invention relates to web transport arrangements in general, and more particularly to arrangements which transport elongated information carrier, such as perforated paper tape or magnetic recording tape. In particular the invention relates to tape recorders and other such information-handling storing equipment as employ magnetic tape or other elongated-web-type information carriers.

Conventionally, the information-bearing tape in such equipment is initially wound on a supply reel and is unwound therefrom onto a take-up reel, and thereafter rewound onto the supply reel. In certain applications, a problem exists with respect to the complete unwinding of the tape from the supply reel. It is often the case, for instance in various types of magnetic-tape cassettes and cartridges, that the tape wound on the supply reel has one end connected to the supply reel, so that the tape cannot be separated from the supply reel, thereby avoiding the need to "thread" the tape onto the supply reel prior to rewinding of the tape. A difficulty which arises when one end of the tape is secured to the supply reel is that the advancing means which unwinds the tape from the supply reel will not stop its operation when the tape is unwound from the supply reel to the maximum possible extent. If it should happen that the apparatus employing such tape is not being carefully attended to by an operator, it is possible for the tape advancing means to exert a pull on the secured tape end for long periods of time, such as overnight or even for days, if the situation is not perceived and rectified by the operator.

In view of the above difficulty, various expedients have been devised for effecting automatic shutoff of the tape advancing means when the end of the tape is reached, that is, when the tape is substantially completely unwound from the supply reel. One such expedient involves the provision at the tape end of the metallic leader-strip having one end secured to the supply reel. The metallic leader-strip passes by a special transducer head responsive to it and generates a shutoff signal when the tape is substantially completely unwound. Other such expedients are known.

A significant disadvantage of the known expedients is the requirement for a special transducer head or special electronic detecting unit for detecting the presence of either the metallic leader-strip or else for detecting a special-frequency or other coded signal on the tape indicative of complete unwinding of the tape.

SUMMARY OF THE INVENTION

It is the general object of the present invention to provide an arrangement of the type referred to above, which effects shutoff of the tape advancing means in response to substantially complete unwinding of the tape from the supply reel, but which is particularly simple in construction, and simpler in concept than the arrangements known heretofore.

This object, and others which will become more understandable from the description below, can be met according to the present invention by providing, in a web transport arrangement, particularly an arrangement for transporting magnetic tape and the like, a combination which, briefly stated, comprises a supply reel, an elongated web wound on said reel and having one end secured to said reel and reversible advancing means including an electric motor and operative for advancing the web in a first direction to unwind the web from the supply reel and alternatively in an opposite second direction to rewind the web onto the supply reel. The motor has a first motor current path including a first switch and an auxiliary motor current path including a second switch. A mode selector unit has at least first and second settings for respectively causing the advancing means to advance the web in said first and second directions. A web-end-sensing unit is operative for opening said first switch to stop said advancing means in response to an increase of web tension resulting upon substantially complete unwinding of the web from the supply reel, and overriding means is operative in a setting other than said first setting of said mode selector unit for closing said auxiliary switch, to permit the flow of motor current through said auxiliary motor current path.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
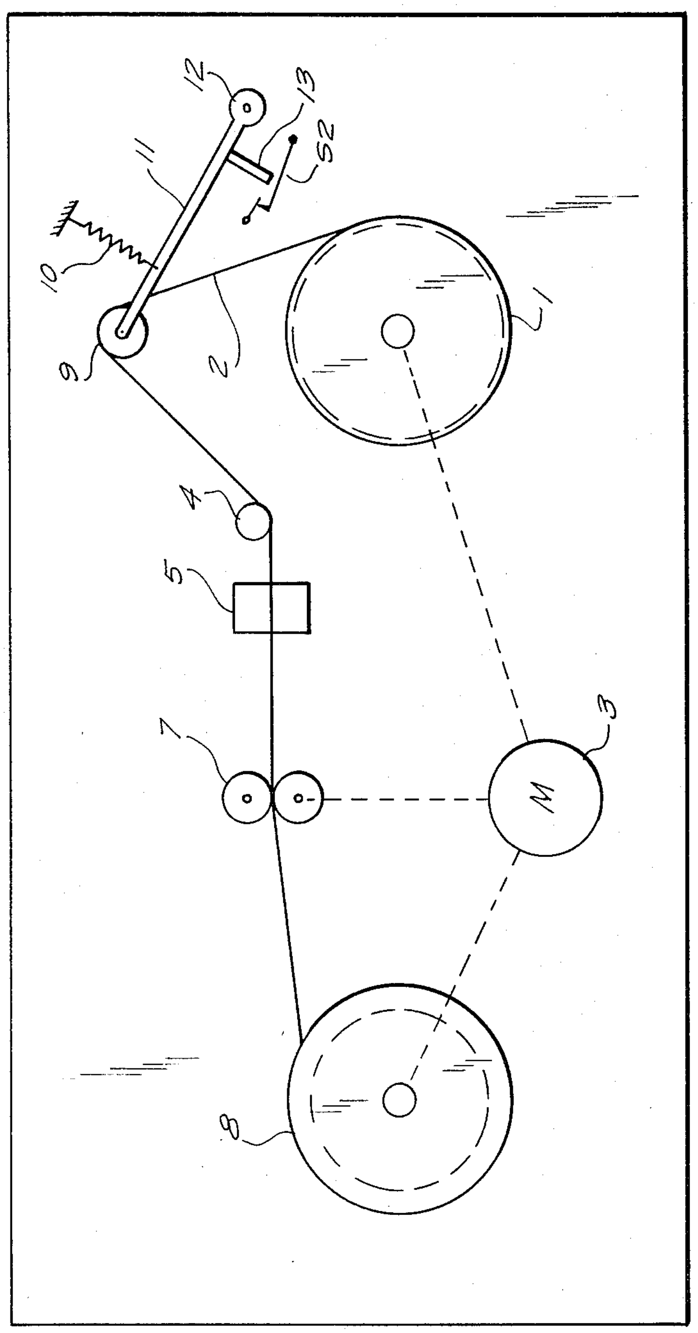
FIG. 1 shows in very schematic manner a playback machine.

FIG. 1 depicts in very schematic manner a playback machine provided with the arrangement according to the present invention. For the sake of simplicity, the machine depicted is a playback machine having only two modes of operation: forward or play mode, and reverse or rewind mode. A playback-record tape recorder of the conventional type would of course have additional modes of operation such as forward record mode, fast forward mode, fast erase mode, etc. The present invention is limited in its applicability neither to ordinary magnetic tape playback machines nor to playback or recording machines or equipment of any particular kind, but is applicable wherever the problem of unwinding an elongated web from a supply reel is encountered.

FIG. 1, reference numeral 1 designates a supply reel, which is shown in the drawing as being nearly full. Reference numeral 2 designates a magnetic tape wound on supply reel 1. Tape 2 passes over a guide roller 9, over a further guide roller 4, through a playback transducer head 5, through capstan-type advancing means 7 and is wound onto take-up reel 8. Details of such playback machines which are completely conventional will not be described here unless they relate directly to the inventive features.

The tape-advancing means of the arrangement includes an electric motor 3, and also means for terminating operation of the motor when the tape 2 has been substantially completely unwound. Specifically, the tape 2 travels over a guide roller 9 which is mounted for rotation at the end of a pivoted lever 11 which is pivoted at 12. A tension spring 10 has one end connected to lever 11 and another end connected to a stationary part of the housing of the playback machine. When the tape 2 has not been completely unwound the tape exerts upon the lever 11 a certain small force in opposition to that exerted by tension spring 10. This is due to the tension in the tape as it is pulled off the supply reel by the capstan-type advancing means 7. This small force exerted by the tape on the lever 11 causes some stretching of the spring and some pivoting of the lever 11 in counterclockwise direction (as seen in FIG. 1) about the pivot point 12.

One end of the tape 2 is secured to the supply reel 1. Accordingly, when the tape 2 has been unwound from the supply reel 1 to the maximum possible extent the capstan drive 7, which continues to pull on the tape, will cause a very marked increase in the tension of the tape 2. This great increase in tape tension overcomes the opposing force of tension spring 10 and causes lever 11 to pivot in counterclockwise direction about pivot axis 12 to a considerable extent. Lever 11 is provided in the region of its pivot axis with a small projection 13. When the tape tension rises suddenly in the manner just described and the lever 11 pivots downwardly, projection 13 separates the electrical contacts of electrical switch S2 causing an interruption of the current path through switch S2. This results in immediate termination of energy supply to motor 3, and termination of operation of the capstan-type tape-advancing means.

Figure 2:
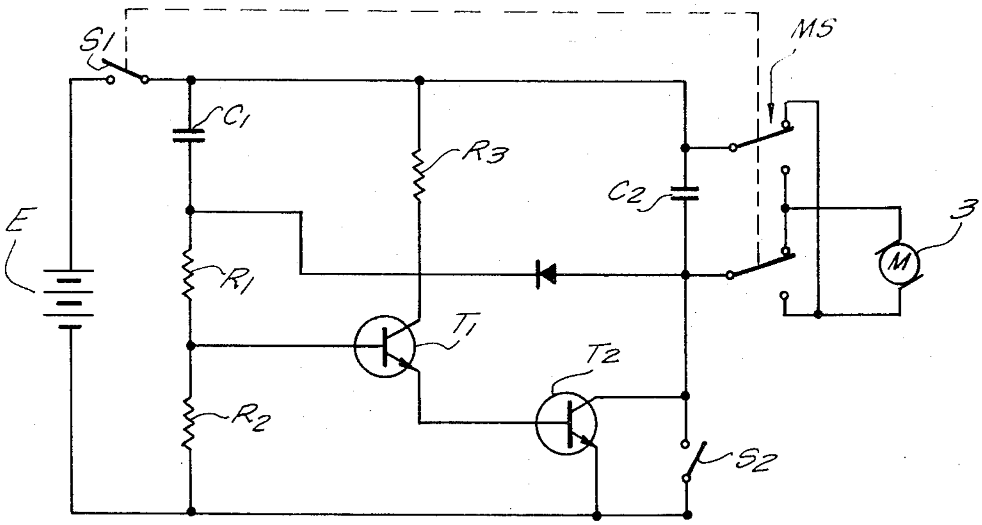
FIG. 2 is a circuit diagram illustrating the circuitry contained in one embodiment of the overriding means according to the invention.

The circuit in which switch S2, just referred to, is incorporated is shown in FIG. 2. The electric motor of the tape advancing means is again designated by reference numeral 3 and has a first current path including switch S2. Specifically, this first current path includes the illustrated battery, a normally closed switch S1, the internal motor current path extending between the motor terminals, and finally the switch S2. Transistor T2, for reasons which will be explained below, is normally nonconductive, and accordingly when switch S2 is opened in response to the increase of tape tension resulting upon substantially complete unwinding of the tape 2 from the reel 1, the supply of energy to the motor 3 is terminated.

It will be noted that motor 3 is reversible because its motor terminals are connected to the positive terminal of the battery and also to the collector of transistor T2 by means of a double-pole double-throw reversing switch labelled MS. This is the mode selector swtich which effects selection of the mode of operation of the playback machine. As mentioned before, a playback machine having only foward-play and reverse-rewind modes is being described for purposes of simplicity. It will be self-evident that during the time tape 2 is being unwound from the supply reel 1, the mode selector swtich MS will be in its first setting, corresponding to the forward-play mode. When the tape end is reached, the switch S2 will remain in open condition for a substantial length of time, depending upon the tension in the tape 2 and depending upon whether the capstan drive permits the formation of slack in the length of tape extending from the capstan drive to the supply reel 1.

The end of the tape having been reached, the user of the playback machine will ordinarily now move the mode-selector switch MS to its second setting corresponding to the rewind mode of operation. However, as just explained, switch S2 will still be in open condition, and therefore motor current will not be able to flow through the first motor current path (including switch S2) defined above.

For this reason, an auxiliary motor current path is provided. The auxiliary motor current path includes the illustrated battery, the normally closed switch S1, the internal current path of the motor between its motor terminals, and the collector-emitter path of transistor T2, transistor T2 constituting an auxiliary switch connected in parallel with the first switch S2.

Switch S1 is normally closed, and for this reason transistor T2 is normally non-conductive. This is because closing of switch S1 permits capacitor C1 to charge up to a voltage sufficiently great as to maintain the base voltage of transistor T1 too low for that transistor to conduct. The more negative terminal of capacitor C1 will not be at ground potential, and accordingly the voltage across the series-connected resistors R1 and R2 will not be zero; however, the voltage division ratio between resistors R1 and R2 can be so selected as to assure that the base of transistor T1 is at so low a voltage as to very decisively prevent conduction by transistors T1 and T2.

When switch S2 opens because the tape end has been reached, and when an attempt to effect rewinding is made by moving mode selector switch SM to its second or rewind setting, almost no current can flow through the motor 3 until and unless transistor T2 becomes conductive. (It is noted that a very minute current, on the order of microamperes, can flow through the motor 3 through the diode D and the resistors R1 and R2 to ground; however, so small a current will not effect running of the motor, and can therefore be ignored). Inspection of the illustrated circuit shows that transistor T2 will become conductive if switch S1 is opened. Specifically, if switch S1 is opened, then capacitor C1 will rapidly discharge through the motor and through the diode, and the base voltage of transistor T1 will rapidly rise turning transistor T1 on. As a result transistor T2 is turned on and a path for current in parallel with the open switch S2 is established.

The discharge of capacitor C1 upon opening of the switch S1 will occur very rapidly, because of the extremely small forward-bias resistance of the diode D and because of the very small resistance associated with the motor winding. Thus, to effect discharge of capacitor C1, switch S1 need remain open for only a brief moment, and can then be immediately closed to complete the auxiliary motor current path defined above. To make sure that switch S1 is opened only momentarily, so as to render transistor T2 conductive but then immediately restore the connection between the positive battery terminal and the motor, a mechanical linkage means (symbolized by the dotted-line connection in FIG. 2) couples the mode selector switch MS and the charging-discharging switch S1. Whenever mode selector switch MS is moved from one to the other of its settings, e.g., from its first setting to its second setting, or from its second setting to its first setting, the switch S1 will be momentarily opened, to discharge capacitor C1 and render auxiliary switch T2 conductive.

Figure 3:
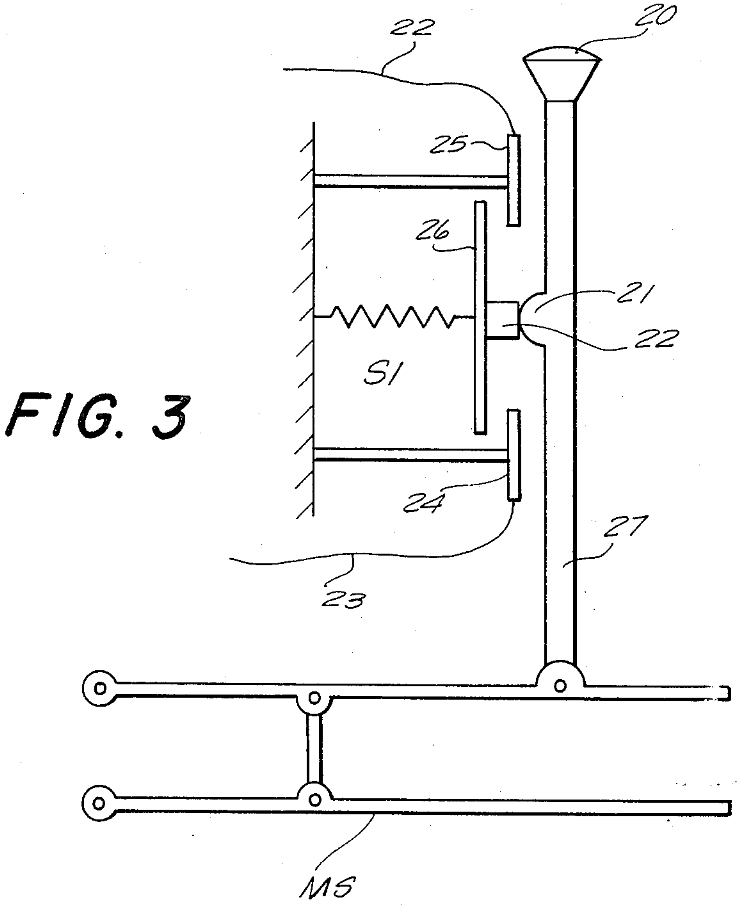
FIG. 3 is a detail view of the mode selector unit showing its connection to the electrical circuitry of the overriding means shown in FIG. 2.

An exemplary form of this mechanical linkage means is depicted rather schematically in FIG. 3. The movable portion of a double-pole reversing switch MS is depicted on an enlarged scale. This reversing switch is located interiorly of the housing of the playback machine according to the exemplary emdodiment. Pivotally linked to the movable portion of switch MS is a linkage rod 27 having a knob 20 accessible to a user of the playback machine, i.e., located exteriorly of the machine housing. In the illustration of FIG. 3, it is assumed that movement of the knob 20 to its uppermost position (upwardly of the position shown in FIG. 3) corresponds to the forward-play mode of operation of the machine; conversely, movement of the knob 20 to its lowermost position (downwardly of the position shown in FIG. 3) corresponds to the rewind mode of operation of the machine. The linkage rod 27 is provided with a bulging cam portion 21 which travels past a projection 22 mounted on a conductive member 26. Conductive members 24, 25 and 26 together constitute the capacitor charging-discharging switch S1 shown schematically in FIG. 2. Switch S1 is closed when conductive element 26 electrically engages both contact 24 and also contact 25. Conductive element 26 is biased in rightwards direction (as seen in the drawing) by a compression spring, so that the switch S1 is normally in closed or conductive state. However, when knob 20, and with it linkage rod 27, is raised or lowered to effect a change of the setting of mode selector switch MS, cam surface 21 will move past projecting portion 22 of element 26 and push element 26 in leftwards direction (as seen in the drawing), interrupting the electrical engagement between element 26 and one or both of elements 24 and 25. Thus, when the mode selector knob 20 is activated to change operating modes, switch S1 is briefly opened, with the switch S1 becoming closed as soon as the selector knob 20 actually reaches the setting towards which it is being moved.

Thus, whenever the setting of mode selector switch MS is changed, capacitor C1 will be discharged, and auxiliary switch T2 will become conductive, bypassing open switch S2, and permitting commencement of the rewind operation.

As soon as the rewind operation has proceeded to a certain extent, the tension of the length of tape between capstan 7 and reel 1 greatly decreases, causing lever 11 to pivot in clockwise direction and thereby causing switch S2 to return to its closed condition. After this point, the provision of an auxiliary current path through the collector-emitter path of transistor T2 becomes superfluous. After a certain length of time, transistor T2 will in fact become non-conductive, leaving only switch S2 to conduct the motor current. This is because switch S1, subsequent to its brief opening, again provides a charging path for capacitor C1, and capacitor C1 charges up to a value eventually turning transistors T1 and T2 off. Because the charging path of capacitor C1 is through the relatively high-impedance path containing resistor R2, the length of time transistor T2 remains conductive, subsequent to the brief opening of switch S1, is considerable, and the component values will be chosen to insure that T2 remains conductive for a time safely in excess of that required for the tape tension to fall to a level resulting in closing of switch S2.

The above-described exemplary arrangement is but one embodiment of the concept of the present invention. While a simple playback machine having only two operational modes has been illustrated, the invention is similarly applicable to playback-record machines having four or five modes of operation. When the end of the tape is reached, a change of the setting of the mode selector switch can be made to effect closing of an auxiliary switch, in the same manner as described above.

Furthermore, the tape can have one of its ends secured to the supply reel and the other of its ends secured to the take-up reel, with an additional tape-end sensing device, like the one illustrated, provided for sensing when the other end of the tape is reached during the rewind operation, in addition to sensing when the end of the tape is reached during the forward or play operation. As a further possibility, the tension-reponsive switch means S2 can be made responsive to both the complete unwinding from the supply reel and also to the complete unwinding from the take-up reel, instead of providing two such switch means S2, one for each of the two reels.

Finally, the invention is applicable to equipment other than equipment making use of magnetic tape. Any kind of information bearing tape, and also tapes or elongated webs of any kind whatsoever and not bearing information of any sort, may cause in their winding and rewinding the same types of problems dealt with herein, and of course such analogous problems in different contexts can likewise be dealt with by applying the basic concept of the present invention.

It will be understood that each of the elements described above, or two or more together, may also find a useful application in other types of circuits and constructions differing from the types described above.

While the invention has been illustrated and described as embodied in a playback machine having means responsive to tape tension for shutting off the tape-advancement motor when the tape end is reached, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore such adaptations should and are intended to be comprehended within the meaning and range of equivalence of the following claims.

What is claimed as new and desired to be protected by Letters Patent is set forth in the appended claims.

I claim:

1. In a web transport arrangement, particularly in an arrangement for transporting magnetic tape and the like, the combination comprising: a supply reel; an elongated web wound on said reel and having one end secured to said reel; reversible advancing means including an electric motor and operative for advancing said web in a first direction to unwind said web from said reel and alternatively in opposite second direction to rewind said web onto said reel; means connected to said motor and defining a first motor current path including a first switch and also defining an auxiliary motor current path including an auxiliary switch; mode selector means having at least first and second settings for respectively causing said advancing means to advance said web in said first and second directions; web-end-sensing means for opening said first switch to stop said advancing means in response to an increase of web tension resulting upon substantially complete unwinding of said web from said reel; overriding means operative in a setting other than said first setting of said mode selector means for closing said auxiliary switch; and said means defining said current paths include at least portions of said mode selector means, web-end-sensing means, and overriding means.

2. An arrangement as defined in claim 1, wherein said overriding means comprises means operative in said second setting of said selector means for closing said auxiliary switch at least until said first switch closes in response to a reduction in web tension resulting upon rewinding of said web onto said reel.

3. An arrangement as defined in claim 1, wherein said first switch and said auxiliary switch are connected in parallel.

4. An arrangement as defined in claim 1, wherein said auxiliary switch is an electronic switch.

5. An arrangement as defined in claim 3, wherein said auxiliary switch is an electronic switch.

6. An arrangement as defined in claim 1, wherein said auxiliary switch is an electronic switch, and wherein said overriding means comprises an overriding circuit connected to said electronic switch and operative for normally maintaining said electronic switch non-conductive and also connected to said mode selector means and operative for rendering said electronic switch conductive whenever the setting of said mode selector means is changed from said first setting to said second setting.

7. An arrangement as defined in claim 1, wherein said auxiliary switch is an electronic switch, and wherein said overriding means comprises an overriding circuit connected to said electronic switch and operative for normally maintaining said electronic switch non-conductive and also connected to said mode selector means and operative for rendering said electronic switch conductive whenever the setting of said mode selector means is changed.

8. An arrangement as defined in claim 6, wherein said electronic switch has a control input, and wherein said overriding circuit comprises a source of voltage, a capacitor connected in circuit with said source of voltage to be charged by the same, charging-discharging switch means in the current path of said capacitor and operative for alternatively effecting a first change of stored energy of said capacitor and an opposite second change of stored energy of said capacitor, and wherein said capacitor is so connected to said control input of said electronic switch as to render said switch non-conductive upon completion of said first change of stored energy and render said switch conductive upon completion of said opposite second change of stored energy, said mode selector means being coupled to said charging-discharging switch means for causing said capacitor to undergo said second change of stored energy whenever the setting of said mode selector means is changed from said first setting to said second setting.

9. An arrangement as defined in claim 6, wherein said overriding means comprises a source of voltage, a capacitor, a control switch operative for connecting one terminal of said capacitor to one terminal of said source, charging resistance means connected to the other terminal of said source and to the other terminal of said capacitor to form with said source and with said control switch a charging circuit for said capacitor when said control switch is closed, means connecting said one terminal of said capacitor to one terminal of said motor, and a diode connecting the other terminal of said motor to the other terminal of said capacitor to form a discharge path for said capacitor when said control switch is opened.

10. An arrangement as defined in claim 9, wherein said electronic switch has a control input, and wherein said charging resistance means comprises a pair of series-connected resistors connected in series with said capacitor and with said source of voltage and defining between themselves a junction connected to said control input of said electronic switch for applying to said control input a voltage dependent upon the voltage across said capacitor.

11. An arrangement as defined in claim 10, wherein said overriding means further includes an additional electronic switch having an output connected to said control input of said first-mentioned electronic switch for controlling the conductivity of the latter and having a respective control input, and wherein said junction is connected to the control input of said additional electronic switch.

12. An arrangement as defined in claim 11, wherein both of said electronic switches are transistors and wherein the respective control inputs of said electronic switches are the bases thereof.

* * * * *